United States Patent [19]

Porter

[11] 4,087,728

[45] May 2, 1978

[54] ADJUSTABLE STROKE ELECTRIC MOTOR USING STROKE ADJUSTING LINKAGE MEANS

[75] Inventor: Richard B. Porter, Bloomington, Minn.

[73] Assignee: Honeywell Inc., Minneapolis, Minn.

[21] Appl. No.: 744,670

[22] Filed: Nov. 24, 1976

[51] Int. Cl.² .............................................. H02P 3/00
[52] U.S. Cl. ..................................... 318/466; 318/626
[58] Field of Search ............... 318/466, 626, 627, 286, 318/267, 268; 338/172, 198, 200

[56] References Cited

U.S. PATENT DOCUMENTS

| | | | |
|---|---|---|---|
| 2,616,013 | 10/1952 | Greenlee | 318/626 |
| 2,788,478 | 4/1957 | Gray | 318/626 |
| 3,027,460 | 3/1962 | Boldingh | 318/626 |
| 3,714,537 | 1/1973 | Bur | 318/466 |

FOREIGN PATENT DOCUMENTS 757,029  9/1956  United Kingdom.
1,070,146  5/1967  United Kingdom.

Primary Examiner—David Smith, Jr.
Attorney, Agent, or Firm—Alfred N. Feldman

[57] ABSTRACT

An electric control motor which utilizes a reduction type of gear train to provide output motion to a shaft for positioning devices such as valves, dampers, and other similar equipment is disclosed. This type of control motor is limited in rotation of the output shaft to less than 360 degrees so that the shaft can be used as a positioning force in numerous control applications. The total number of angular degrees rotated by the output shaft of the motor is readily adjustable by changing a potentiometer setting. In order to protect the motor, the linkages, and its load, a limit switch is also provided. A single stroke adjusting linkage that has a readily accessable location is used to concurrently set the stroke potentiometer and the limit switch so that the output shaft of the control motor is limited in movement to a predetermined number of angular degrees.

8 Claims, 7 Drawing Figures

ADJUSTABLE STROKE ELECTRIC MOTOR USING STROKE ADJUSTING LINKAGE MEANS

BACKGROUND OF THE INVENTION

Electric control motors have been used for the positioning of control equipment such as dampers, valves, and other types of regulating equipment. Normally these motors utilize a conventional electric motor and gear reduction to drive an output shaft which has an angular rotational limit of less than 360°. More typically the angular rotation is limited to the range of 90 the use to 160 rotational degrees. These motors generally utilized fixed limit switches to establish the number of rotational degrees that the motor will be allowed to operate within. When a motor utilizing a fixed degree of rotation is utilized, it is necessary to connect the motor to different types of loads by the use of varying types of crank arms or linkages that have to individually be adjusted for the number of degrees of rotation of the motor shaft and the amount of movement required of the load.

In more recent years, it has become common to provide control motors that have an adjustable stroke or number of rotational degrees. The adjustable stroke type motors normally have an adjustment range of 90 to 160 rotational degrees in order to provide the most convenient application of the motor to various loads. For example, an air damper in a duct, usually utilizes a 90° rotation from its full open to its full closed position. In some cases, such as in the operation of a valve, the rotation of 90° may not be adequate to completely operate the valve. In that case a longer stroke is necessary.

Where a single motor is used on varying types of applications, the stroke can be changed by the use of different types of linkages. This is very expensive and time consuming. It is also possible to provide control motors that have varying stroke lengths that are adjustable by mechanically positioning the limit switches. In this case the motor must be constructed so that the limit switches are readily accessble to the installer, and are accessable moveable in position around the output shaft. Other types of variable stroke motors have been provided wherein the variation in stroke length is accomplished by setting a potentiometer which is in a circuit that controls the electronics or electric circuit operating the motor.

It has been recently found that where adjustable stroke motors using a stroke adjusting potentiometer are used, that occasionally a malfunction of the electrical control circuit can cause the motor to rotate more rotational degrees than are desirable. This causes damage to either the motor or the load, and it is, therefore, desirable to also position a limit switch at the same point of rotation as that established by the use of a potentiometer in setting the stroke for the motor. This could be conceivably accomplished by providing a motor with separate adjustments of a stroke adjustment potentiometer and a limit switch. This type of arrangement, wherein two separate adjustments are necessary, leads to complication and expense in the installation.

SUMMARY OF THE INVENTION

The present invention is directed to a unique arrangement wherein a stroke adjusting potentiometer is used to vary the rotational output of a control motor and at the same time the limit switch that backs up or protects the motor against malfunctions is concurrently adjusted to the same number of rotational degrees as is the stroke potentiometer. In the present invention this is accomplished by utilizing a single adjusting lever which is mechanically connected to move the stroke adjusting potentiometer and the position of the limit switch at the same time. In the present invention this stroke adjusting linkage means is arranged so that the linkage means is mounted through a slot in the terminal board used to wire the motor into a control circuit so that the installer has ready access to the adjusting linkage means. The adjustment of the motor rotation or stroke is automatically matched to the rotation of the limit switch to protect the motor, and the controlled equipment, against any type of failure which would ordinarily cause the electric motor to exceed the amount of rotation preselected by the adjustment of the potentiometer.

DESCRIPTION OF THE PREFERRED EMBODIMENT

Figure 1:
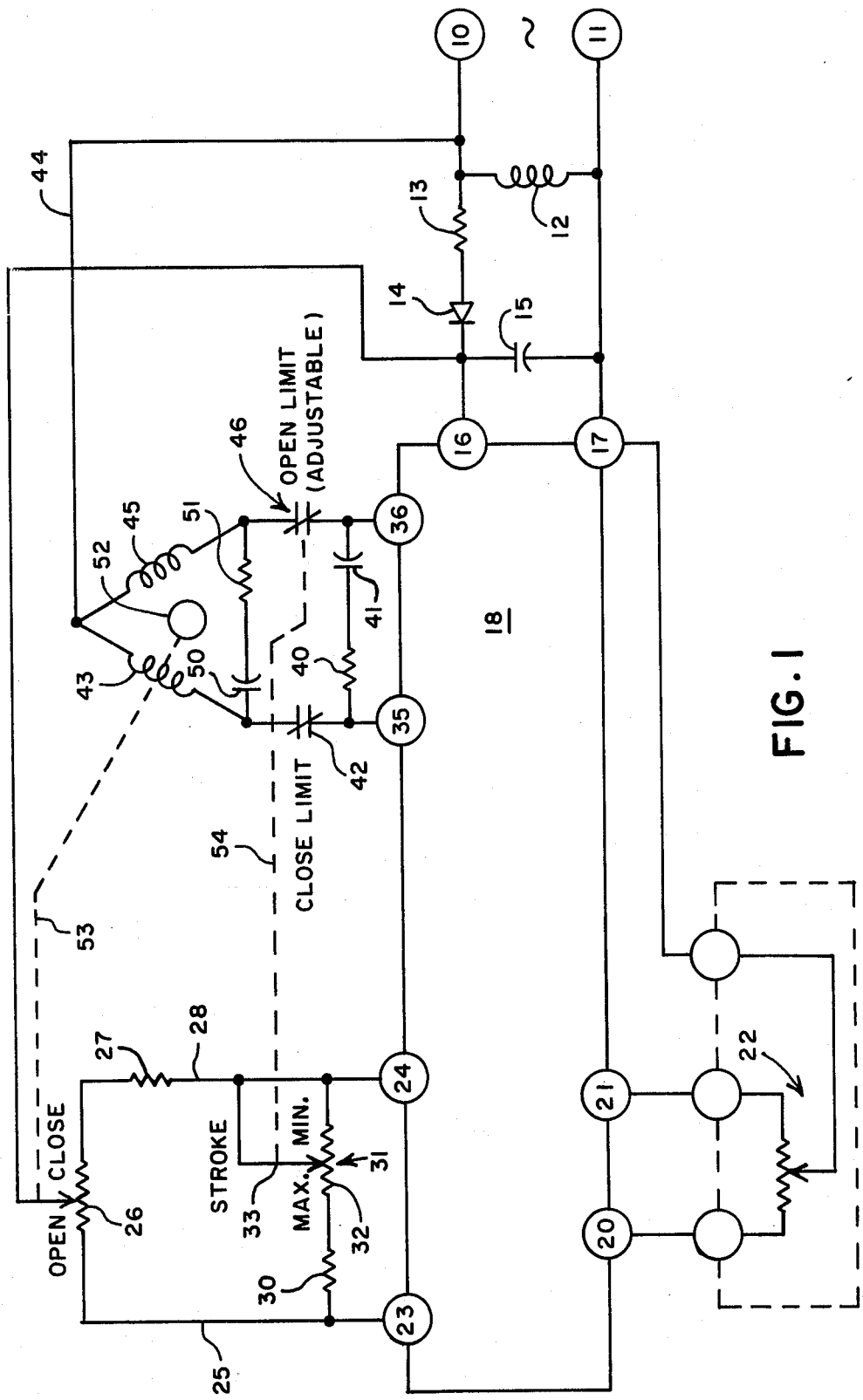
FIG. 1 is a schematic representation of a control circuit and control motor.

In FIG. 1 the present invention is disclosed in schematic form as applied to a bridge balance, closed loop type of motor control system. The present invention can most simply be understood if the system is considered to be a two-position system, wherein the control motor drives from a first extreme position which can be considered the closed position for the system to a second extreme position which can be considered the open position for the system. The terms open and closed generally refer to the load being operated by the motor and are common in the heating and air conditioning industry in which the present motor has great utility. The system could be a system in which the motor drives in one direction electrically and is spring returned in the reverse direction, a system in which the motor is electrically operated for rotation in either direction between the open and closed positions, or could be a completely modulating type of system.

In the schematic of FIG. 1 electric power is supplied between terminals 10 and 11 and is of a voltage compatible with the particular motor and electronics to be used. A typical control motor would operate from a 24 volt, 60 hertz supply. Connected across the terminals 10 and 11 is a winding 12 that operates an electromagnetic braking mechanism when the system is used with a spring return arrangement. Also connected across the terminals 10 and 11 are a resistor 13, a diode 14 and a capacitor 15 which supplies an appropriate direct current potential to terminals 16 and 17 of an electric or electronic circuit generally disclosed at 18. The specific electronics of the present invention are not material and, therefore, this portion of the system has been shown in block form.

The electric circuit 18 has a pair of terminals 20 and 21 that are connected to an external potentiometer 22 that provides an input set point for the system. A typical system would include a potentiometer 22 that is responsive to temperature, or some other condition to be controlled. The electric circuit 18 has a further pair of terminals 23 and 24, with terminal 23 connected to a conductor 25, a rebalance potentiometer means 26, a bridge resistor 27, and a conductor 28 which is connected back to the terminal 24. Connected between the conductors 25 and 28 are a resistor 30 and a stroke adjusting resistance means 31. The stroke adjusting resistance means 31 has been disclosed as a potentiometer with a resistance portion 32 and an adjustable wiper element 33. While the stroke adjusting resistance means 31 has been shown as a potentiometer, this element could be a rheostat by omitting the connections between the end of the resistance element 32 and the conductor 28.

The potentiometers 22, 26 and the resistance elements 27, 30 and 32 form part of a conventional bridge circuit of a closed loop motor control arrangement which is well known in the control art. The balance of the bridge resistance network is not shown and is included in the electric circuit 18, as is well understood in the art. As has been previously indicated, the use of a stroke adjusting resistance means 31, in and of itself, is known in the art and provides a motor control system wherein the motor rotation has one fixed, extreme position (referred to as the closed position) and a variable second position (referred to as the open position). By varying the potentiometer 31 the amount of rotation at the open end of rotation can be varied, typically between 90° and 160° of angular rotation of the output shaft of the motor.

A further pair of terminals 35 and 36 are provided from the electric circuit means 18 and these terminals are bridged by resistor 40 in series with a capacitor 41. The resistor 40 and capacitor 41 form a snubber network to protect the solid state switching devices that are contained in the electric circuit means 18. Also connected to terminal 35 is a conventional closed limit switch 42 that is in series with a first motor winding 43 that is connected by conductor 44 to terminal 10 of the electric source. The conductor 44 is then connected through a second motor winding 45 to an adjustable limit switch means 46 that is connected to the terminal 36. The adjustable limit switch means 46 and the fixed limit switch 42 generally make up a limit switch means for the device which will provide safety for the electric motor control means and the load being driven by that motor. The details of the adjustable limit switch means 46 will be disclosed in substantial detail, as its structure and operation are important to the present invention.

The electric motor structure is completed by providing a capacitor 50 and a series resistance 51 connected across the windings 43 and 45 in a conventional delta configuration. The motor has an armature and gear reduction mechanism 52 that drives an output shaft and feedback means 53 to potentiometer 26. The potentiometer 26 is driven to rebalance the bridge network in accordance with the setting of the potentiometer 22, in a manner that is well understood in the electric closed loop motor control art. The disclosure of FIG. 1 is completed by providing a stroke adjusting linkage means 54 that connects the adjustable limit switch means 46 and the potentiometer wiper 33 of the stroke adjusting potentiometer means 31. The stroke adjusting linkage means 54 is arranged to concurrently adjust the position of the potentiometer means 31 and the limit switch means 46 so that the number of angular degrees of rotation that are predetermined by the setting of the wiper 33 is brought into conformance with the position of the limit switch means 46 to protect the motor and any driven load in the event of an electrical failure. That failure could be of the bridge network that forms an input to the electric circuit means 18, or any of the interior components of the electric circuit means 18 that would cause the motor to drive the load in such a way as to rotate a greater number of angular degrees than the predetermined number of angular degrees selected by the setting of the potentiometer wiper 33. The mechanical structure that makes up the stroke adjusting linkage means 54 is disclosed in substantial detail in the remaining figures of the present disclosure.

Figure 2:
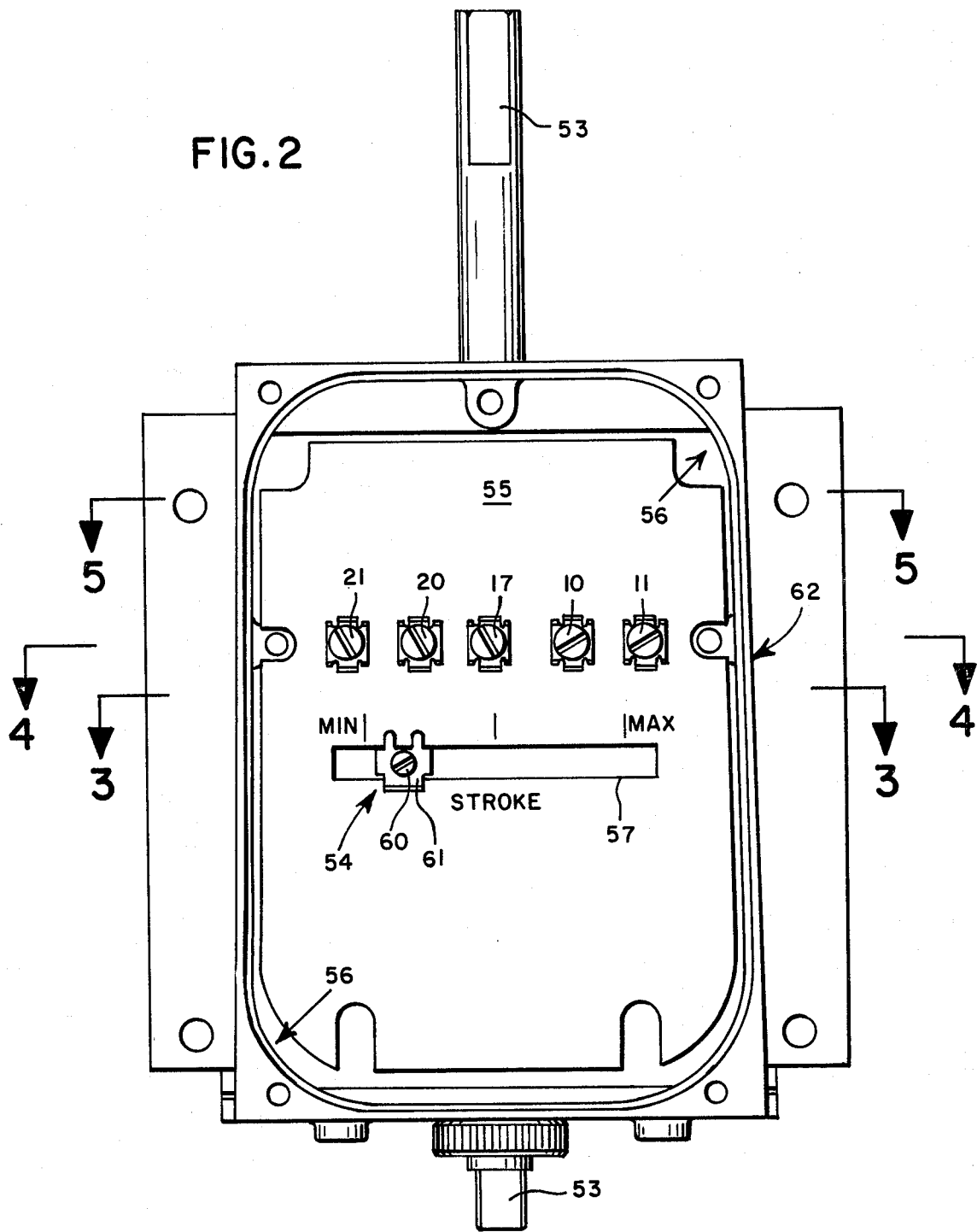
FIG. 2 is a top view of the control motor.

In FIG. 2 a top view of the physical structure of an adjustable stroke electric motor is disclosed with its top removed to expose a terminal board 55 which is recessed in a chamber 56. The terminal board 55 has a plurality of terminals that correspond to the terminals 10, 11, 17, 20 and 21 of FIG. 1. These five terminals allow for the introduction of the necessary electric power and for the connection of a three terminal potentiometer 22 which is normally mounted remote from the motor itself.

The terminal board 55 further has a slot 57 which has the stroke adjusting linkage means 54 slideably mounted therein. The stroke adjusting linkage means 54 includes a locking means in the form of a screw 60 and a clamp-like member 61. The tightening and loosening of screw 60 provides a clamping motion between the clamp-like member 61 and the terminal board 55 so that the stroke adjusting linkage means 54 can be positioned in the slot 57 between the minimum and maximum positions, which have been noted on the slot. These two positions would generally correspond to a 90° angular rotation of the shaft 53 and a 160° angular rotation. The shaft 53 is shown extending through the adjustable stroke electric motor which is generally encased in a housing 62. The electric motor and its housing 62 are shown in the form typical of a device which is commercially available and marketed by Honeywell Inc., and which is known as an M955 type of Modutrol motor. The disclosure in FIG. 2 has been provided to show the terminal board slot 57, the locking means 60 and 61, and the terminal arrangement, as well as providing the basis of the cross sections of the motor which are disclosed in greater detail in connections with FIGS. 3, 4 and 5.

Figure 3:
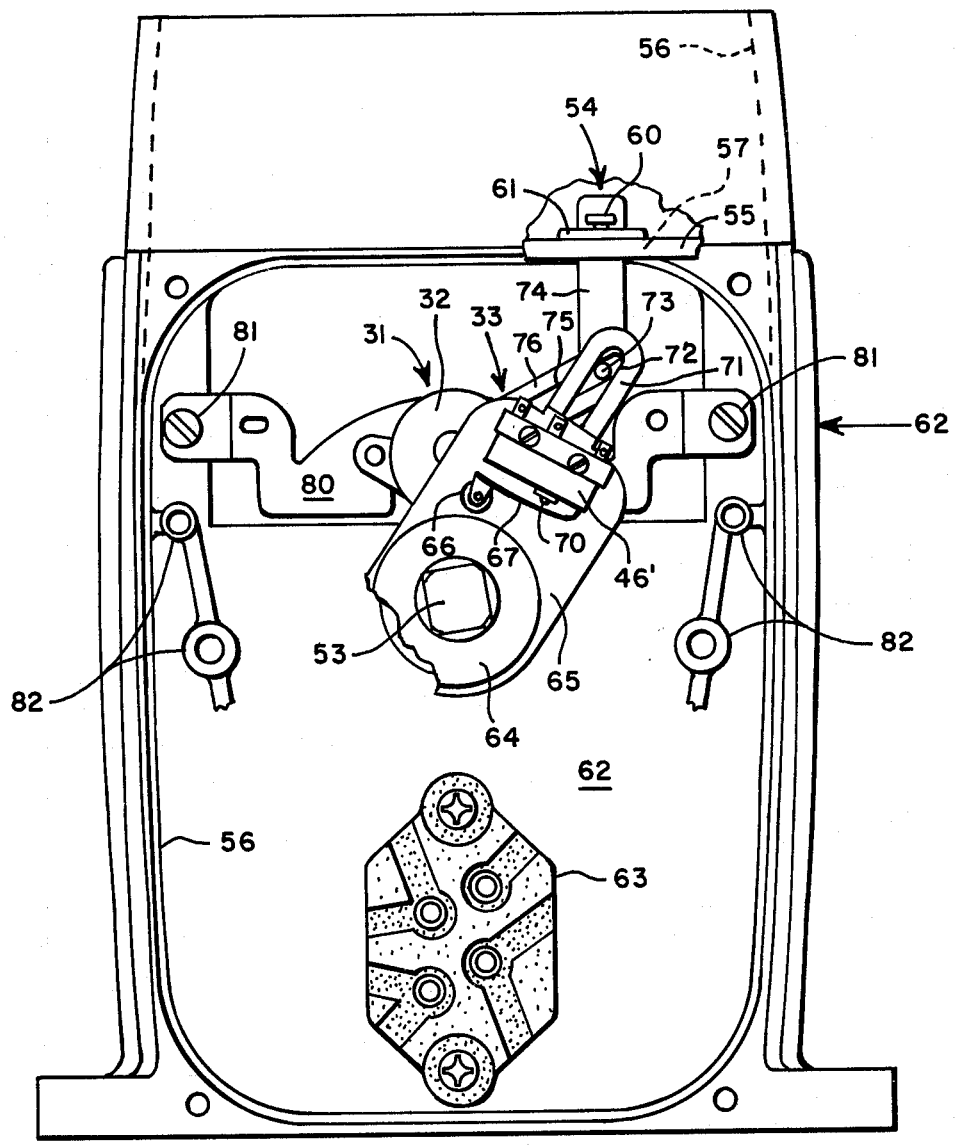
FIG. 3 is a cross section of the control motor along lines 3—3 of FIG. 2.

In FIG. 3 there is disclosed a sectional view of the adjustable stroke motor means along the lines 3—3 of FIG. 2. This sectional view generally discloses an elevation of the control motor housing 62 wherein the chamber 56 is disclosed as having a fluid tight chamber 62 that is oil filled and contains the basic motor elements including the windings 43 and 45, the armature 52, and the gear reduction mechanism which is mechanically terminated in the shaft 53 and electrically terminated to a terminal means 63. This structure is all conventional in electric control motors and is only incidental to the details of the present invention. The output shaft 53 is sealed by a conventional packing and hub 64 around which is concentrically mounted a rotatable member 65 so that the member 65 is capable of rotation with the shaft 53 being its center of rotation. Mounted on the rotatable member 65 is a snap switch 46' that forms part of the adjustable limit switch means 46. The snap switch 46' has a rotor 66 connected to an arm 67 that can apply pressure to the switch operating mechanism 70. The snap switch 46' is attached to the rotatable member 65 in any convenient manner, but would normally be attached so that the snap switch means 46' could be adjusted in position slightly as a final assembly procedure.

The rotatable member 65 has an elongated projection 71 that contains a slot 72 wherein the elongated member 71 and the slot 72 is a first of a pair of slotted arms that engage a pin 73 that is attached to an arm 74 that forms part of the stroke adjusting linkage means 54. The arm 74 projects through the slot 57 in the terminal board 55 and accepts the screw 60 which is part of the locking means to position the stroke adjusting linkage means 54 in the slot 57 at any selected location. The pin 73 also projects through a slot 75 in a second slotted arm 76 that forms part of the adjustable resistance means 31 that has been disclosed as a potentiometer with the wiper 33. The wiper 33 is attached to the slotted arm 76 so that as the pin 73 moves in the slot 75, the slotted arm 76 is caused to rotate and thereby changes the position of the potentiometer wiper 33.

The adjustable resistance means or potentiometer 31 is mounted to a bracket 80 that is mounted by a pair of screws 81 into the chamber 56 so that the bracket 80 mounts the potentiometer 31 in a plane parallel to the limit switch member 46' so that as the stroke adjusting linkage means 54 is adjusted in the slot 57, both the potentiometer means 31 and the limit switch means 46 are adjusted concurrently to the same number of angular degrees of rotation desired from the output shaft 53.

The chamber 56 has a number of mounting means that are utilized in connecting or supporting various other elements. Included in these mounting means are a number of bosses 82 that are used to support an insulating or printed circuit board which mounts a number of other components used in the electric circuit means 18. The details of the printed circuit board will not be disclosed as they are not material to the present invention and it will be shown only as mounting the necessary portions of the present control system to explain the present invention, as will be brought out in more detail in connection with FIGS. 4, 5 and 6.

Figure 4:
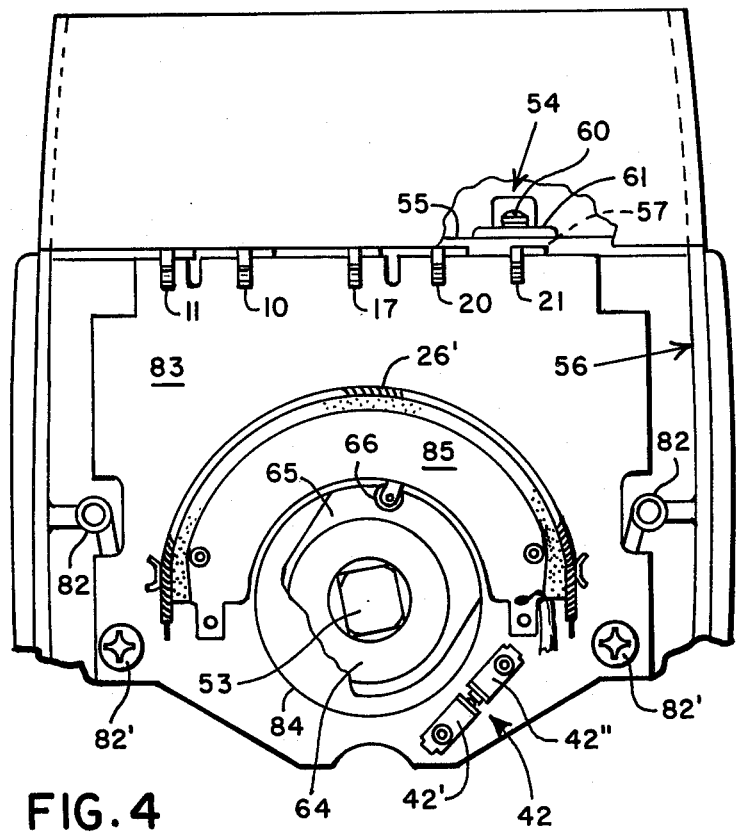
FIG. 4 is a cross section of the control motor along lines 4—4 of FIG. 2.

In FIG. 4 an elevation along lines 4—4 of FIG. 2 of a printed circuit board 83 is disclosed. The printed circuit board 83 is inserted over the bosses 82 and into projections from the terminals 10, 11, 17, 20 and 21 which project down from the terminal board 55. A hole 84 in the printed circuit board 83 is concentric with the 53 shaft 43 for the motor means and the printed circuit board 83 is quite rigidly held in place by these described members and screws 82'. As has been previously indicated, the printed circuit board 83 and the electronic components that make up the electric control circuit 18 are not disclosed for the sake of clarity. Mounted on the printed circuit board 83 is the follow up potentiometer resistor 26' and it is formed concentrically with the output shaft 53 so that as the output shaft 53 rotates it can drive a potentiometer wiper that rides on the potentiometer resistor 26' as will be described in connection with FIG. 5. Also mounted on the printed circuit board 83 is a conductive area 85 that forms part of the potentiometer 26. The potentiometer 26 completes a circuit from the resistance element 26' to the conductive area 85. These elements have been shown only for continuity of disclosure of the total motor structure.

The limit switch 42 is also disclosed as two elements 42' and 42" which are mounted on the printed circuit board 83. This limit switch is fixed in position and is operated by a rotating member that will be disclosed in detail in connection with FIGS. 5, 6A and 6B. This limit switch construction is again a conventional limit switch that is fixed in position and is operated by a member which is attached and driven on the output shaft 53. In the hole 84 in the printed circuit board 83 there is disclosed the output shaft 53 and the hub 64 which holds the rotatable member 65 in place. Once again the member 66 of switch 46' can just be seen through the opening 84.

Figure 5:
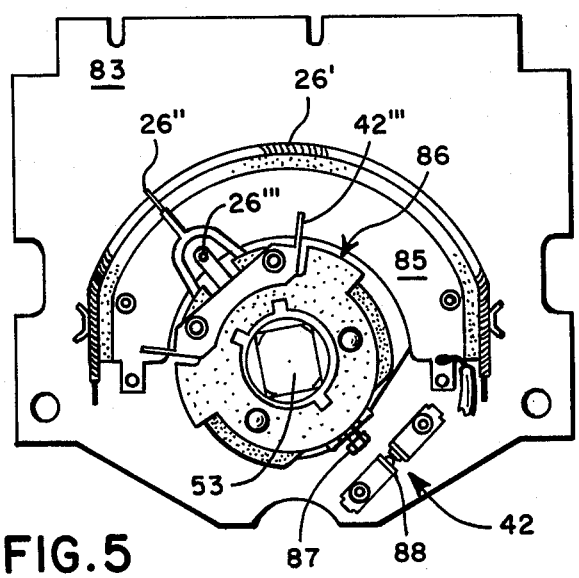
FIG. 5 is an elevation of a potentiometer wiper and caming arrangement as viewed along lines 5—5 of FIG. 2.

In FIG. 5 there is disclosed an elevation of the printed circuit board 83 along the line 5—5 as disclosed in FIG. 2. In this particular view a further assembly generally disclosed at 86 is detailed. The assembly 86 is a potentiometer wiper assembly along with a cam-like projection that is curved and which cooperates with the electrical switch 46' to form the adjustable limit switch means 46. The details of an elevation of potentiometer wiper assembly 86 are shown in FIG. 5 with the potentiometer wiper assembly 86 mounted on the output shaft 53, and in much greater detail in two views by itself in FIGS. 6A and 6B. In FIG. 5, the potentiometer wiper assembly 86 includes a potentiometer wiper 26" which slides on the resistance element 26' and cooperates with a slideable contact 26''' to form the potentiometer 26 that is the follow up potentiometer as disclosed in FIG. 1. The potentiometer wiper assembly 86 rotates with the shaft 53 and provides the close loop follow up for the system. This particular structure is held in place by a set screw 87 that locks the potentiometer wiper assembly 86 into its proper place on the shaft 53.

Attached to the potentiometer wiper assembly 86 is a limit switch operating means 42''''. The limit switch operating means 42'''' rotates with the potentiometer wiper assembly 86 until it engages part of the fixed limit switch 42 when the motor has rotated in a full clockwise direction as viewed in FIG. 5. The projection 42'''' comes into contact with a projection 88 on the fixed limit switch 42 and causes an open circuit to stop the motor in a full clockwise direction as viewed in FIG. 5. To this point, the follow up potentiometer arrangement and the limit switch arrangement is part of a conventional electrical control motor. A curved, cam-like member is attached to the potentiometer wiper means 86 on the side reverse from that disclosed in FIG. 5 and that element will be described in detail in connection with FIGS. 6A and 6B.

Figure 6A:
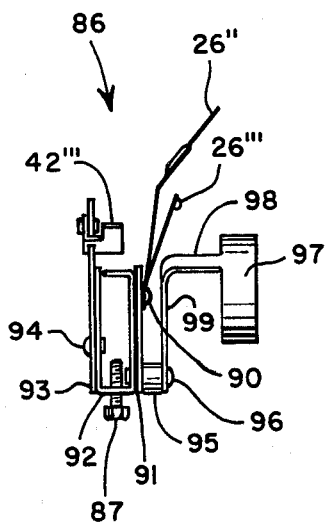
FIG. 6A is a side view of the cam-like member.

In FIG. 6A a side view of the potentiometer wiper assembly 86 is disclosed wherein the wiper elements 26" and 26''' are disclosed as riveted as at 90 to an insulating board 91 that is attached to a frame 92 that includes the set screw 87. A further insulating member 93 is riveted at 94 to the frame 92 and carries the projection 42'''' in an electrically insulated mode from the balance of the structure. The frame 92 carries a further mounting member 95 that is shown held by a pair of rivets 96 thereto. The rivets pass through a curved, cam-like member 97 that forms part of the adjustable limit switch means 46. The curved, cam-like member 97 operates against the projection 66 of the snap switch 46' to form the operating member for the limit switch 46.

Figure 6B:
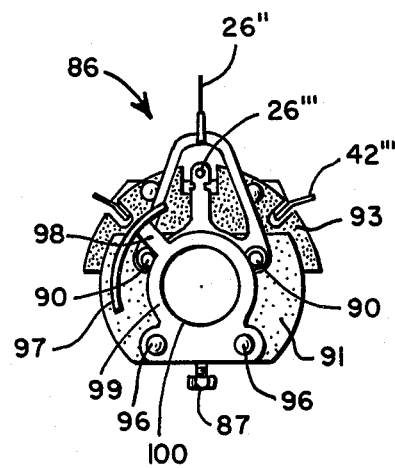
FIG. 6B is an additional view of the cam-like, member.

As will be seen in FIG. 6B, the curved, cam-like member 97 is attached by an arm 98 to a support 99 that is riveted at 96 to the insulating member 91. The curved, cam-like member 97 further has a hole 100 that is positioned around the shaft 53 so that the entire potentiometer wiper assembly 86 can be mounted on the shaft 53 by the screw 87 and will rotate with the shaft 53 to act as the operating member for the follow up potentiometer 26 and as the limit switch means for both the clockwise and counterclockwise operation of the device.

In referring to FIG. 3, it will be understood that as the stroke adjusting linkage means 54 is slid in the slot 57 in the terminal board 55 that the pin 73 moves in a linear motion. As this linear motion occurs, the arms 71 and 76 of the limit switch means 46 and the stroke adjusting potentiometer 31 also move. The movement of the snap switch 46' along with the adjustment of the potentiomete 31 sets into the control system, as described in FIG. 1, the open position for the rotation of the potentiometer The concurrent adjustment of the potentiometer wiper 33 and the position of the snap switch 46' keep the electrical and mechanical limits of the system together.

In order to properly operate the snap switch 46' at any of its rotational positions as adjusted by the movement of pin 73, the curved, cam-like member 97 has a curved portion that is equivalent to the number of angular degrees through which the present device can be adjusted so that the snap switch means 46' can be operated by the cam-like member 97 contacting the roller 66 through the entire adjustment range.

By providing a potentiometer and a rotatable limit switch means that are mechanically linked together, the present adjustable stroke electric motor can have its adjustment accomplished by the movement of a single adjusting linkage means which concurrently adjusts both the resistance means and the limit switch means for the motor by the same number of angular degrees of rotation so that the operation of the motor, as dictated by the electric circuitry is mechanically protected or backed up by the mechanical limit switch being adjusted to prevent any accidental rotation beyond that desired. As has been previously mentioned, the electrical circuitry of this type of motor has been known to fail in such a manner as to call for continued rotation of the control motor. If the mechanical limit switch were not adjusted to compensate for the electrically limit, a for limit, a failure could cause the motor to be energized beyond the desired turn off point with quite a disastrous effect. In this type of situation, either the motor structure must give, or the mechanical load must give. In either case an expensive failure occurs. The present invention allows for a single adjustment mechanism to concurrently adjust the electrical and mechanical limits so that an inadvertent electrical failure is backed up by a mechanical limit switch to protect either the load or the motor itself depending on the type of installation involved.

The present invention could be carried out by any number of different types of mchanical connecting structures between the potentiometer 31 and the limit switch 46. One particular construction that has been found to be particularly desirable has been disclosed in great detail. Other structures could readily be accomplished and the present invention is limited solely by the scope of the appended claims.

The embodiments of the invention in which an exclusive property or right is claimed are defined as follows:

1. In an adjustable stroke electric motor, including: electric motor means having limit switch means responsive to rotation of said motor means to safely limit the rotation of said motor means to a predetermined number of angular degrees; electric circuit means for controllably energizing said motor means with said circuit means including stroke adjusting resistance means; said stroke adjusting resistance means being capable of being adjusted to cause said electric circuit means to control the rotation of said motor means to said predetermined number of angular degrees; and stroke adjusting linkage means connected to said resistance means and said limit switch means to concurrently adjust said resistance means and said limit switch means to the same number of angular degrees of rotation of said motor means to limit the operation of said motor means in the event said electric circuit means becomes defective and would thereby energize said motor means in such a way as to cause said motor means to rotate a greater number of angular degrees than said predetermined number of angular degrees.

2. In an adjustable stroke electric motor as described in claim 1 wherein said stroke adjusting resistance means is a potentiometer.

3. In an adjustable stroke electric motor as described in claim 2 wherein said limit switch means includes an electrical switch and a switch operating member that are independently mounted on said electric motor means; said electric motor means having an output shaft that moves said electric switch and said switch operating member relative to each other to limit the rotation of said output shaft to said predetermined number of angular degrees.

4. In an adjustable stroke electric motor as described in claim 3 wherein said electric switch is a snap switch and said switch operating member is a curved, cam-like member that cooperates with said snap switch to operate said snap switch when said output shaft rotates to a preset limit position of said output shaft that corresponds to said predetermined number of angular degrees.

5. In an adjustable stroke electrical motor as described in claim 3 wherein said electrical switch is mounted on a rotatable member that is adjustably mounted concentrically with said output shaft and is connected to said stroke adjusting linkage means; and said switch operating member is a curved, cam-like member that cooperates with said electrical switch to operate said switch when said output shaft rotates to a preset limit position of said output shaft that corresponds to said predetermined number of angular degrees.

6. In an adjustable stroke electric motor as described in claim 5 wherein said electrical switch is a snap switch.

7. In an adjustable stroke electric motor as described in claim 6 wherein said adjusting linkage means including a slideable lever mounted to slide in a slot in a terminal board; said linkage means including a pin that engages a pair of slotted arms that are separately connected to said potentiometer and to said rotatable switch mounting member; and said slideable lever further including locking means to lock said slideable lever in said slot.

8. In an adjustable stroke electric motor as described in claim 7 wherein said limit switch means further includes a fixed limit switch operated by operator means attached to said output shaft at a rotational position of said output shaft in a direction of operation contra to the operation of said adjustable electrical switch.

* * * * *